United States Patent
Gay et al.

(10) Patent No.: US 7,359,721 B2
(45) Date of Patent: Apr. 15, 2008

(54) COMMUNICATION DEVICE FOR DISPLAYING A SHARED MESSAGE

(75) Inventors: Stephen R. Gay, Chicago, IL (US); Christopher C. Gielow, Carlesbad, VA (US)

(73) Assignee: Motorola, Inc., Schaumburg, IL (US)

( * ) Notice: Subject to any disclaimer, the term of this patent is extended or adjusted under 35 U.S.C. 154(b) by 609 days.

(21) Appl. No.: 10/953,773

(22) Filed: Sep. 29, 2004

(65) Prior Publication Data
US 2006/0075349 A1    Apr. 6, 2006

(51) Int. Cl.
*H04Q 7/20* (2006.01)
(52) U.S. Cl. ............ 455/466; 340/7.55; 455/566; 455/575.3
(58) Field of Classification Search ............ 455/466, 455/566, 550.1, 575.1, 575.3, 575.4; 340/7.55
See application file for complete search history.

(56) References Cited

U.S. PATENT DOCUMENTS 5,146,217 A * 9/1992 Holmes et al. ............ 340/7.55
6,175,743 B1 * 1/2001 Alperovich et al. ........ 455/466
6,879,842 B2 * 4/2005 King et al. ............... 455/550.1
6,947,396 B1 * 9/2005 Salmi ........................ 370/310
2004/0214610 A1 * 10/2004 Tanemura et al. .......... 455/566

* cited by examiner

Primary Examiner—Olisa Anwah

(57) ABSTRACT

A message, including for example an image, video, audio, text, and/or haptics, e.g., a digital photograph, is received by a communication device (101) via a receiver (109) operably connected to a communication network (117), and determined by a processor (107) of the communication device (101) to be targeted to a display, such as a secondary display (103) of the communication device. The processor (107) can authenticate the message or messages. Where the message is authenticated, the processor (107) can automatically display the one or more messages, responsive to receipt thereof, on the secondary display (103). Accordingly, a user can glance at the secondary display (103) of the communication device (101) and view messages, e.g., images, video, audio, text, and/or haptics which have been shared by one or more senders.

19 Claims, 5 Drawing Sheets

COMMUNICATION DEVICE FOR DISPLAYING A SHARED MESSAGE

FIELD OF THE INVENTION

The present invention relates in general to wireless communication units and wireless networks, and more specifically to providing a capability for sharing a message among users.

BACKGROUND OF THE INVENTION

Sharing messages, including for example text, video, audio and/or images, between users of communication devices can provide a highly satisfying level of communication between the users, on a personal level, as part of a group. Communication devices are conventionally available that allow a user to send another user a message containing, for example, a photograph or other image, text, video and/or audio, alone or in combination.

Some communication systems provide for accessing video and images via a photograph web log in order to access a desired image or video. Photograph web logs are currently particularly popular in connection with sharing of digital photographs. The photograph web log can be regularly updated by users with messages containing, for example, images and/or video, and optional text and/or audio associated therewith, and provide a centralized storage system from whence the messages may be retrieved by other users for sharing of the messages. Some photograph web logs can focus on photographs, while other may include other types of content. In order to utilize one or more of these systems, a user can access the photograph web log via the mobile device and determine the desired image.

The process of finding and viewing a message that was shared by transmission to a mobile device conventionally involves the user seeking out one or more saved messages. This often results in additional effort by the user. The effort and hence the time involved in this process can contribute to a user not utilizing one or more features that a mobile device can provide in connection with displaying saved messages or images.

BRIEF DESCRIPTION OF THE DRAWINGS

The accompanying figures, where like reference numerals refer to identical or functionally similar elements and which together with the detailed description below are incorporated in and form part of the specification, serve to further illustrate a preferred embodiment and to explain various principles and advantages in accordance with the present invention.

DETAILED DESCRIPTION OF THE PREFERRED EMBODIMENTS

Figure 1:
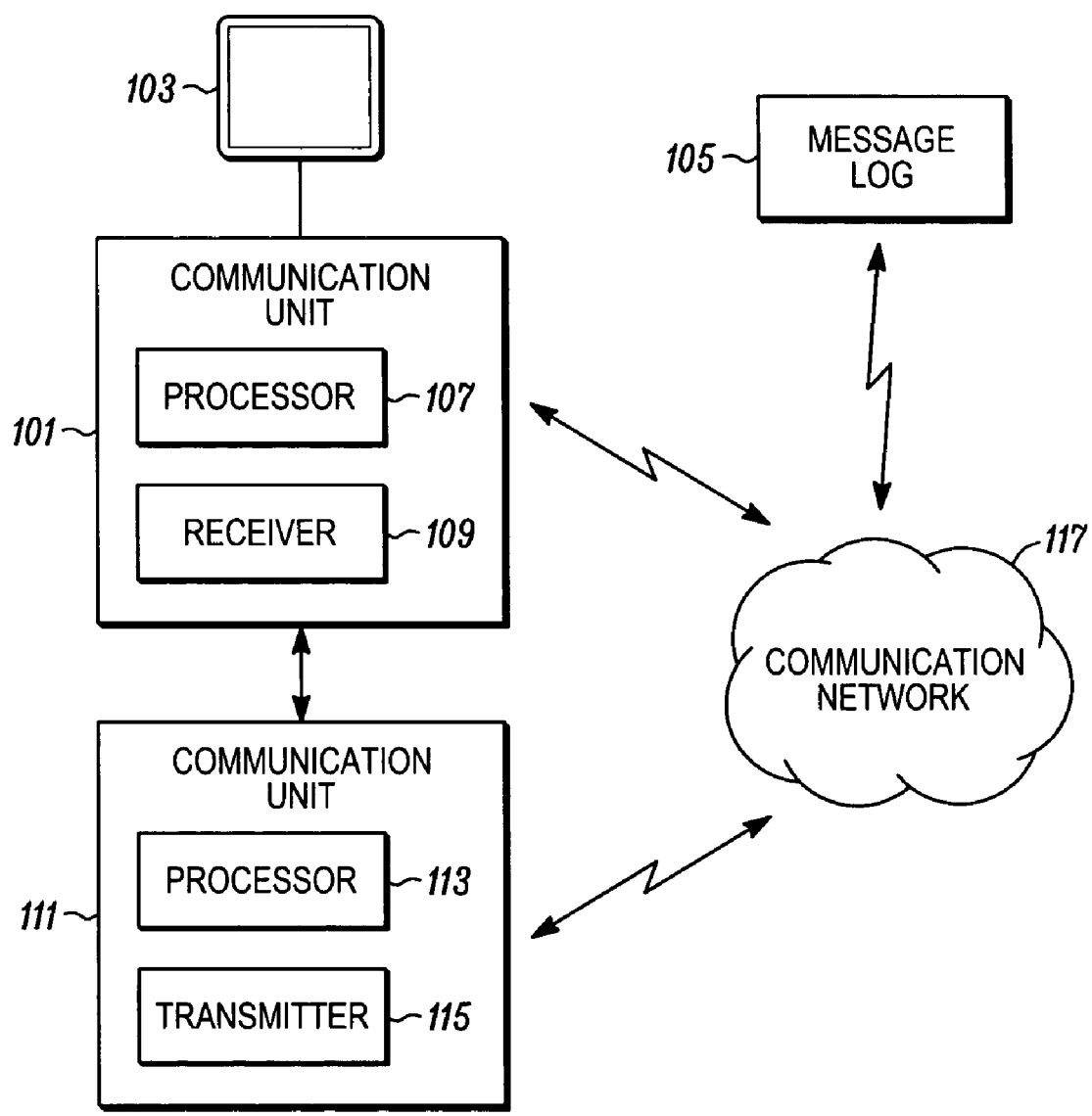
FIG. 1 is a diagram illustrating a simplified and representative environment for transmitting and receiving a message for sharing with a communication unit and exemplary network in accordance with various exemplary embodiments.

In overview, the present disclosure concerns wireless communications devices or units, often referred to as communication units, such as cellular phones or two-way radios and the like having message sending capability, such as associated with a communication system such as an Enterprise Network, a cellular Radio Access Network, or the like. Such communication systems may further provide services such as voice and data communications services. More particularly, various inventive concepts and principles are embodied in systems, communication units, and methods therein for providing a capability for users to share messages between communication units.

It should be noted that the term communication unit may be used interchangeably herein with subscriber unit, wireless subscriber unit, wireless subscriber device or the like. Each of these terms denotes a device ordinarily associated with a user and typically a wireless mobile device that may be used with a public network, for example in accordance with a service agreement, or within a private network such as an enterprise network. Examples of such units include personal digital assistants, personal assignment pads, and personal computers equipped for wireless operation, a cellular handset or device, or equivalents thereof provided such units are arranged and constructed for operation with a display, for example a secondary display, in addition to a primary display. The secondary display may be provided on the communication device in a number of locations (typically positioned on the exterior even when a device is closed, e.g., a "closed lid interface"), can be operated independently of the primary display, and typically can be easily viewed by the user.

The communication systems and communication units of particular interest are those providing or facilitating voice communications services or data or messaging services over cellular wide area networks (WANs), such as conventional two way systems and devices, various cellular telephone systems including analog and digital cellular, CDMA (code division multiple access) and variants thereof, GSM (Global System for Mobile Communications), GPRS (General Packet Radio System), 2.5G and 3G systems such as UMTS (Universal Mobile Telecommunication Service) systems, Internet Protocol (IP) Wireless Wide Area Networks like 802.16, 802.20 or Flarion, integrated digital enhanced networks and variants or evolutions thereof.

Furthermore the wireless communication units or devices of interest can have short range wireless communications capability normally referred to as WLAN (wireless local area network) capabilities, such as IEEE 802.11, Bluetooth, or Hiper-Lan and the like preferably using CDMA, frequency hopping, OFDM (orthogonal frequency division multiplexing) or TDMA (Time Division Multiple Access) access technologies and one or more of various networking protocols, such as TCP/IP (Transmission Control Protocol/Internet Protocol), UDP/UP (Universal Datagram Protocol/Universal Protocol), IPX/SPX (Inter-Packet Exchange/Sequential Packet Exchange), Net BIOS (Network Basic Input Output System) or other protocol structures. Alternatively the wireless communication units or devices of interest may be connected to a LAN using protocols such as TCP/IP, UDP/UP, IPX/SPX, or Net BIOS via a hardwired interface such as a cable and/or a connector.

In accordance with one or more embodiments, the wireless communication units may further communicate with a computer that can log messages for sharing, including, for example, hosting, storing, and/or forwarding messages, for example, systems such as those referred to as a photograph web log (a "photoblog"), and variants or evolutions thereof, referred to herein as a "message log."

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes and/or steps, which can be performed in any order, unless expressly and necessarily limited to a particular order; i.e. processes or steps that are not so limited may be performed in any order.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

As further discussed herein below, various inventive principles and combinations thereof are advantageously employed to contribute to the ability of sharing messages among communication units. According to one or more exemplary embodiments, a communication unit can provide for senders to push messages, including for example images, directly to a recipient, for example a secondary display of the recipient.

Further in accordance with exemplary embodiments, a shared message can be pushed to the secondary display of a recipient's communication device. In overview, according to one or more exemplary embodiments, a message, including presentable content, for example an image, video, audio, text, and/or haptic information (e.g., vibration and/or light patterns) is received by a communication device, and determined to be targeted to the user interface, such as one or more displays, e.g. a secondary display of the communication device. The communication device can, optionally, provide authentication of the message to ensure that it is from a particular approved sender (for example, a friend, a commercial carrier, or approved message log). When the message is authenticated if needed and upon receipt if not, the communication device can automatically display the content of the message in the secondary display. The result is that a user can glance at the communication device and view messages, e.g., images, video, and/or text, which have been shared by one or more of their approved senders. Where the message content includes non-display data, e.g., audio and/or haptics, the communication device can optionally output or present the non-display data as appropriate. Optionally, two or more messages for the secondary display can be provided on the secondary display in a rotating format, e.g., as in a slide show. Optionally, messages can further be shared among users. Optionally, messages intended for the secondary display can further be displayed in an optional peripheral device, such as a digital picture frame.

Referring now to FIG. 1, transmitting and receiving a message for sharing will be discussed and described. FIG. 1 is a diagram illustrating a simplified and representative environment for transmitting and receiving a message for sharing with a communication unit and exemplary network in accordance with various exemplary embodiments. A communication device, for example, a first communication unit 101, can provide for receipt of one or more communications or messages from a second communication unit 111. The first communication unit 101 can include a processor 107, and a receiver 109, for receiving messages, for example when operably connected to a communication network 117 or directly connected to the second communication unit 111.

In overview, the processor 107 can be configured to facilitate receiving messages via the receiver 109 as is generally known. The content of the messages can include video, audio, images, text, and/or haptics. In accordance with one or more exemplary embodiments, such content can include a digital photograph, for example, and optional text associated therewith. The processor 107 can be responsive to the received message such that the received message can be automatically displayed on a secondary display 103 of the first communication unit 101. According to one or more exemplary embodiments, two or more messages can be received for display on a display, such as on the secondary display 103, and can be displayed one at a time, for example, in a sequential manner, such as a slide show format.

Moreover, the processor 107 can be configured to facilitate authenticating the message, for example, such that one or more messages provided on the secondary display 103 can be limited to messages that have been authenticated. According to one or more exemplary embodiments, authenticating the message can include, for example, determining the identity of the sender of the message and determining whether the sender has been approved by the user of the first communication unit 101. Approval can be provided, for example, by a user interacting with the first communication unit 101 to preliminarily designate particular senders as approved. Authentication information could be, for example, provided by comparing the message or information associated therewith against pre-determined authentication information, for example, by comparing the sender with one or more approved senders and their identities, e.g., caller identifications and/or telephone numbers. As an alternative embodiment of providing authentication, authentication can be provided, for example, via a password or unique information included in the message. Representative information associated with the message can be compared with the authentication information.

According to one or more exemplary embodiments, messages that do not pass authentication can be handled as an error, for example, such messages can be dropped, can be viewed as ordinary received messages, and/or can result in an error response to the sender.

Optionally, one or more embodiments can provide for a filter so as to allow particular messages or messages meeting certain criteria to surface to the display. In a situation where a user has received and stored numerous messages, including for example those that are authenticated, the user may prefer that a subset of those messages are displayed, e.g., those from a particular person or group. The user can interface with, e.g., the communication unit, to provide information that can be utilized to filter through the messages to provide the subset to be displayed.

One or more embodiments can provide that the processor 107 is further configured to facilitate transmitting the authentication information to a recipient. The authentication information can be included in a message, as identified by, for example, a unique indication that is expected by the first communication unit.

In accordance with one or more embodiments, the message can be associated with an indication that the message is intended for display on the secondary display 103. Hence, upon receipt of a message, the processor 107 can determine whether the message includes the indication that it is intended for display, for example, on the secondary display 103, and can display the message on the secondary display 103 upon detection of the indication. In accordance with one or more exemplary embodiments, the content of the message or messages can further be stored, for later display on the secondary display 103.

One or more embodiments provide that the processor 107 is configured to facilitate forwarding the message or messages to one or more recipients, for example via a transmitter (illustrated for example in FIG. 2) operably connected to the communication network 117. Such message or messages optionally can be associated with authentication information appropriate for the intended recipient(s), for example, by referring to a table containing authentication information corresponding to various recipients.

One or more exemplary embodiments and alternative embodiments further provide that the first communication unit 101 can be connected via a port (illustrated in connection with FIG. 2) configured as a display interface to an external peripheral for providing an additional display. Accordingly, the processor 107 can be configured to facilitate transmitting the content of the message and/or messages for display via the display interface.

The second communication unit 111 can include a processor 113, and a transmitter 115, for transmitting messages, such as one or more messages to another user intended to be automatically displayed on the secondary display of the communication unit of the other user, for example when operably connected to the communication network 117 or through a direct communication connection. The content of the messages can include video, audio, images, text and/or haptics. In accordance with one or more exemplary embodiments, such content can include a digital photograph, for example, and optional text associated therewith. The content can be prepared in the usual manner whereby the user interacts with the second communication unit 111 to prepare a message to be transmitted.

The processor 113 can be configured to facilitate associating an indication with the message or message that it is intended for display on the secondary display, and to facilitate associating authentication information with the message or messages. In accordance with one or more exemplary embodiments, authentication information can include unique information that is conventionally included in or associated with a transmitted message, for example, caller identification and/or telephone number. As an alternative embodiment, authentication can be provided, for example, via a password or unique information associated with the message, and/or included in the message content and/or header.

Furthermore, the processor 113 can be configured to facilitate transmitting the message or messages as they are associated with the indication and the authentication information. The message or messages as prepared can be transmitted, for example, via the transmitter 115, in accordance with conventional procedures and variants and evolutions thereof.

In accordance with one or more exemplary embodiments, the message or messages can be transmitted to one or more recipients and/or one or more message logs 105. Operation of the message log 105 in accordance with one or more embodiments is described in more detail below. In overview, the message log 105 can forward the message or messages to the intended recipient, optionally with appropriate authentication information.

Figure 2:
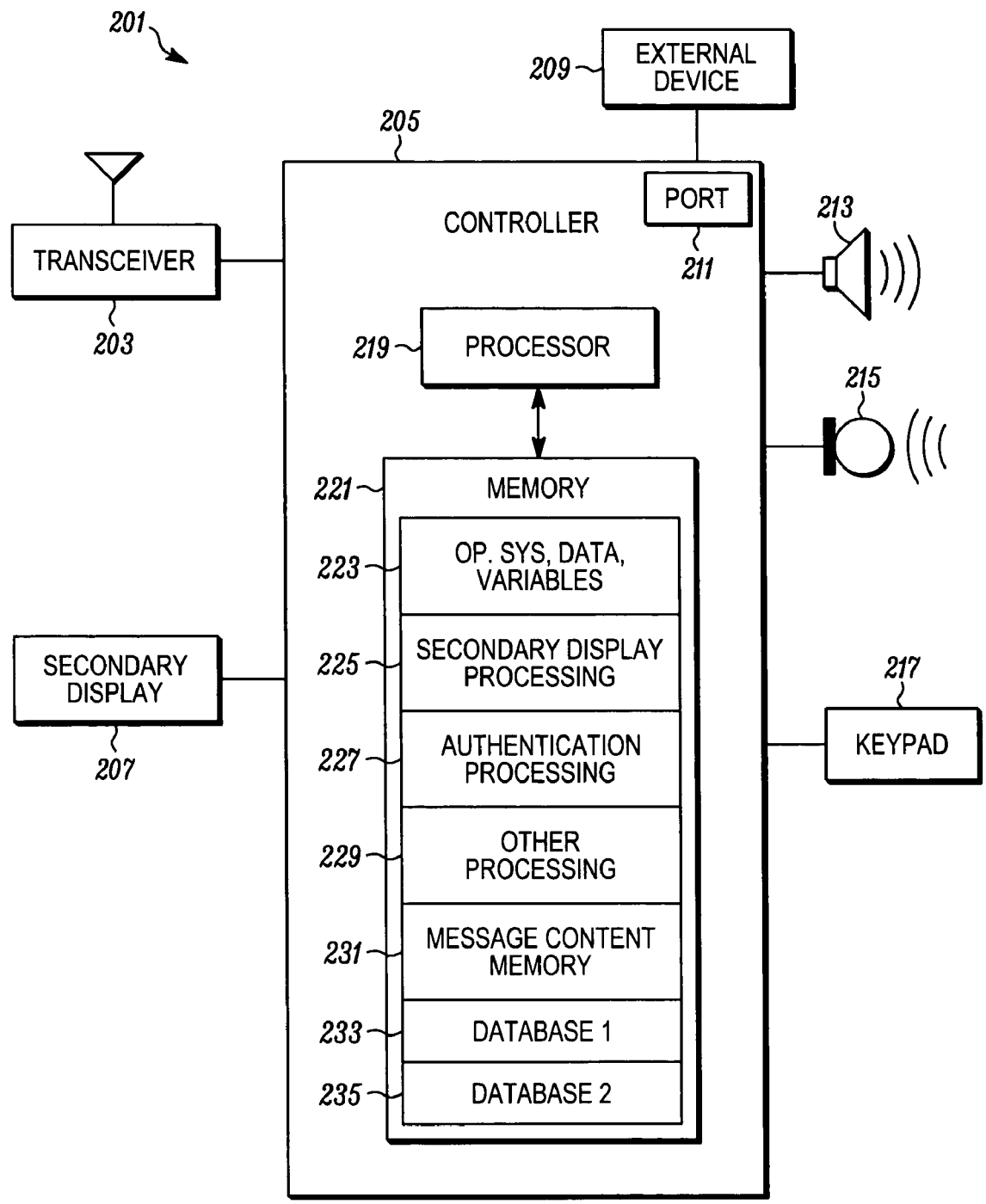
FIG. 2 is a diagram illustrating an exemplary communication unit for sharing a message in accordance with various exemplary embodiments.

According to one or more exemplary embodiments, the processor 113 of the second communication unit 111 can be configured to facilitate receiving one or more messages with authentication information, for example via a receiver (illustrated, for example, in FIG. 2). A message with authentication information can be determined, for example, by a unique indication therein indicating that the message includes authentication information. The authentication information can be stored in association with the particular sender of the authentication information, for later association as authentication information in one or more messages to the particular sender.

In accordance with one or more exemplary embodiments, the communication network 117 can provide access for communication units, e.g., the first communication unit 101 and/or the second communication unit 111, to a message log 105. In overview, the message log 105 provides a location for storing messages that can optionally be forwarded for display on a secondary display of a recipient communication unit. The message log 105 optionally can provide a service of associating authentication information with a particular user, and including the appropriate authentication information with messages sent to the particular user. Accordingly, the second communication unit 111 may connect to the message log 105 in the usual manner and transmit one or more messages to the message log 105. The message log 105 stores the message as usual. Messages that are intended to be transmitted to a recipient for display on a secondary display include an indication with the message or message that it is intended for display on the secondary display, and an indication that the message is associated with or intended for one or more recipients. The message log 105 can detect the indication. The message log 105 can store the recipient information associated with the one or more messages. If appropriate, the message log 105 can also store authentication information (previously described herein) provided in connection with the one or more messages.

In addition, the message log 105 can facilitate transmitting the message or messages associated with the indication and the authentication information (described further herein) to the recipient, in accordance with normal message transmittal procedures. According to one or more exemplary embodiments, the authentication information may have been previously provided by the message recipient (described in more detail herein).

The message log 105 can determine whether or not to perform an association of authentication information with the message or messages, for example, where the message or messages do or do not include the requisite authentication information such as a caller identification and/or password. If available, the authentication information can be associated with the message or messages, and the message that is transmitted will then include the authentication information.

According to one or more embodiments, the message log 105 interacts with a particular user to designate authentication information to be associated with messages transmitted to and/or from the particular user. For example, the particular user can access the message log 105, and indicate the authentication information (e.g., password, caller identification, and/or user telephone number) to be utilized in connection with messages sent by the message log 105 to the particular user for display on the secondary display. In this manner, other users can access a message log 105, select a message or messages to send to the particular user, and have the message log 105 insert authentication information and send the selected message or messages to the particular user.

In accordance with exemplary embodiments, the message log 105 acts as an authenticating intermediary between a user sending a message to be pushed to the secondary display of a particular other user. The message log 105 can receive one or more messages from the user, intended for receipt by the particular user. The message log 105 can be configured to facilitate authenticating the message, as described previously, optionally inserting authentication information if appropriate, and transmitting the one or more messages to the particular user.

According to exemplary embodiments, the message log 105 can include, e.g., one or more processors, one or more transmitters and/or receivers, and can be configured to transmit, receive, and store messages, in accordance with known procedures, systems, and devices.

Referring now to FIG. 2, one or more exemplary embodiments for a communication unit will be discussed and described. FIG. 2 is a diagram illustrating an exemplary communication unit for sharing a message in accordance with various exemplary embodiments or for facilitation of one or more embodiments. The communication device 201 may include a controller 205 having a transceiver 203, a port 211 for communication with an external device 209, a processor 219, a memory 221 communicating with the processor 219, a speaker 213, a microphone 215, a primary display (not illustrated), a secondary display 207, and/or a user input device such as a keypad 217.

The processor 219 may comprise one or more microprocessors and/or one or more digital signal processors. The memory 221 may be coupled to the processor 219 and may comprise a read-only memory (ROM), a random-access memory (RAM), a programmable ROM (PROM), and/or an electrically erasable read-only memory (EEPROM). The memory 221 may include multiple memory locations for storing, inter alia, an operating system, data and variables 223 for programs executed by the processor 219; computer programs for causing the processor to operate in connection with various functions such as processing for the secondary display 225, processing of authentications 227, and/or other processing 229; a message content memory 231, for e.g., storing messages to be displayed on the secondary display 207; a database 233 of various authentication information; and a database 235 for other information used by the processor 219. The computer programs may be stored, for example, in ROM or PROM and may direct the processor 219 in controlling the operation of the communication device 201.

The communication device 201 may be programmed to automatically display message content in the message content memory 231 on the secondary display 207, in accordance with one or more exemplary embodiments. The user may interact with the communication device, specifically processor 219 by invoking functions accessible through the user input device 217, by speaking through the microphone 215, and/or by receiving from the speaker 213. The user input device 217 may comprise one or more of various known input devices, such as a keypad, a computer mouse, a touchpad, a touch screen, a trackball, and/or a keyboard.

The primary display (not illustrated) or secondary display 207 may present information to the user by way of a conventional liquid crystal display (LCD) or other visual display, and/or by way of a conventional audible device (e.g., the speaker 213) for playing out audible messages.

Figure 3:
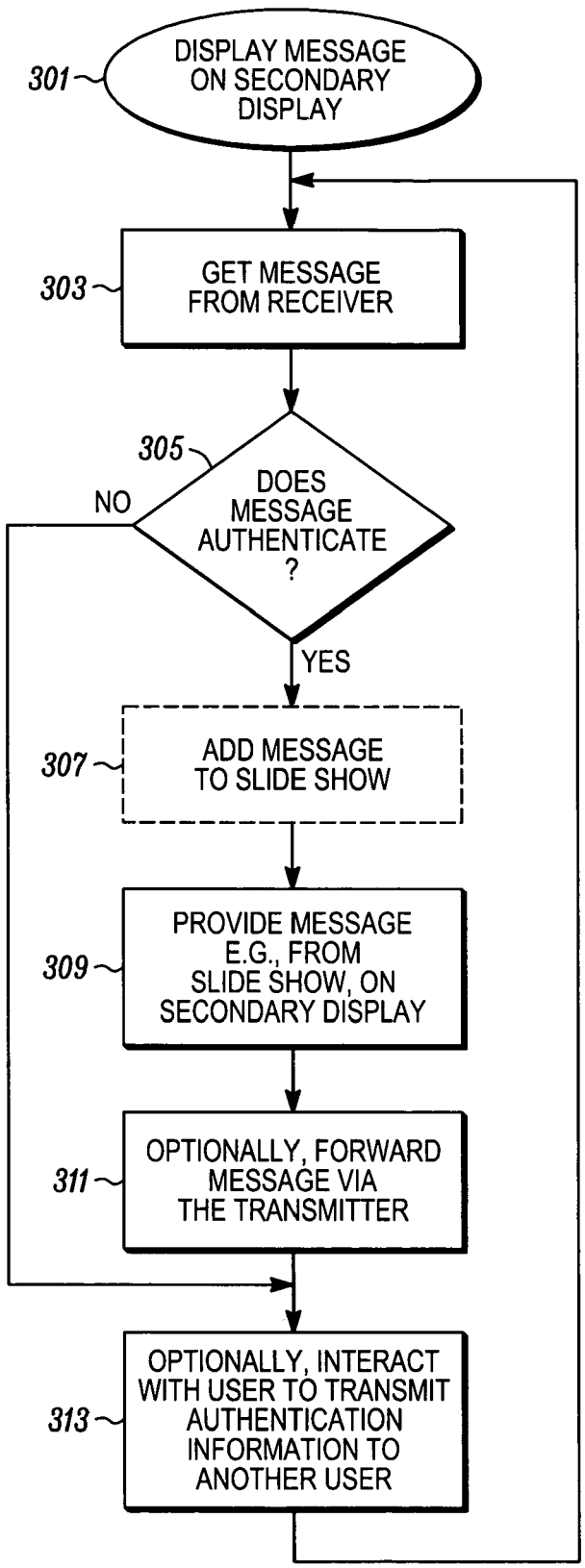
FIG. 3 is a flow chart illustrating an exemplary procedure for displaying a shared message in accordance with various exemplary and alternative exemplary embodiments.
Figure 4:
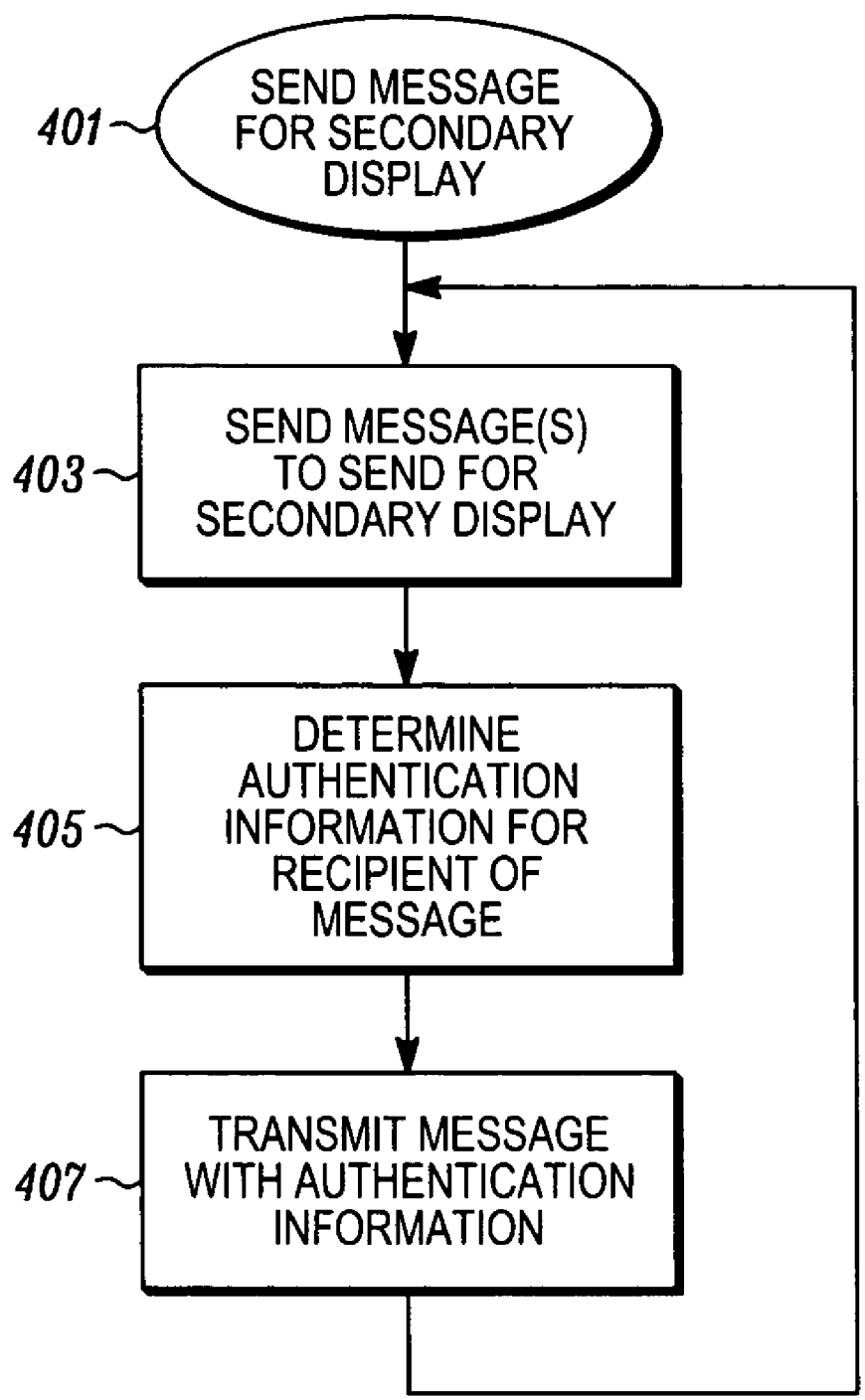
FIG. 4 is a flow chart illustrating an exemplary procedure for sending a shared message in accordance with various exemplary and alternative exemplary embodiments.
Figure 5:
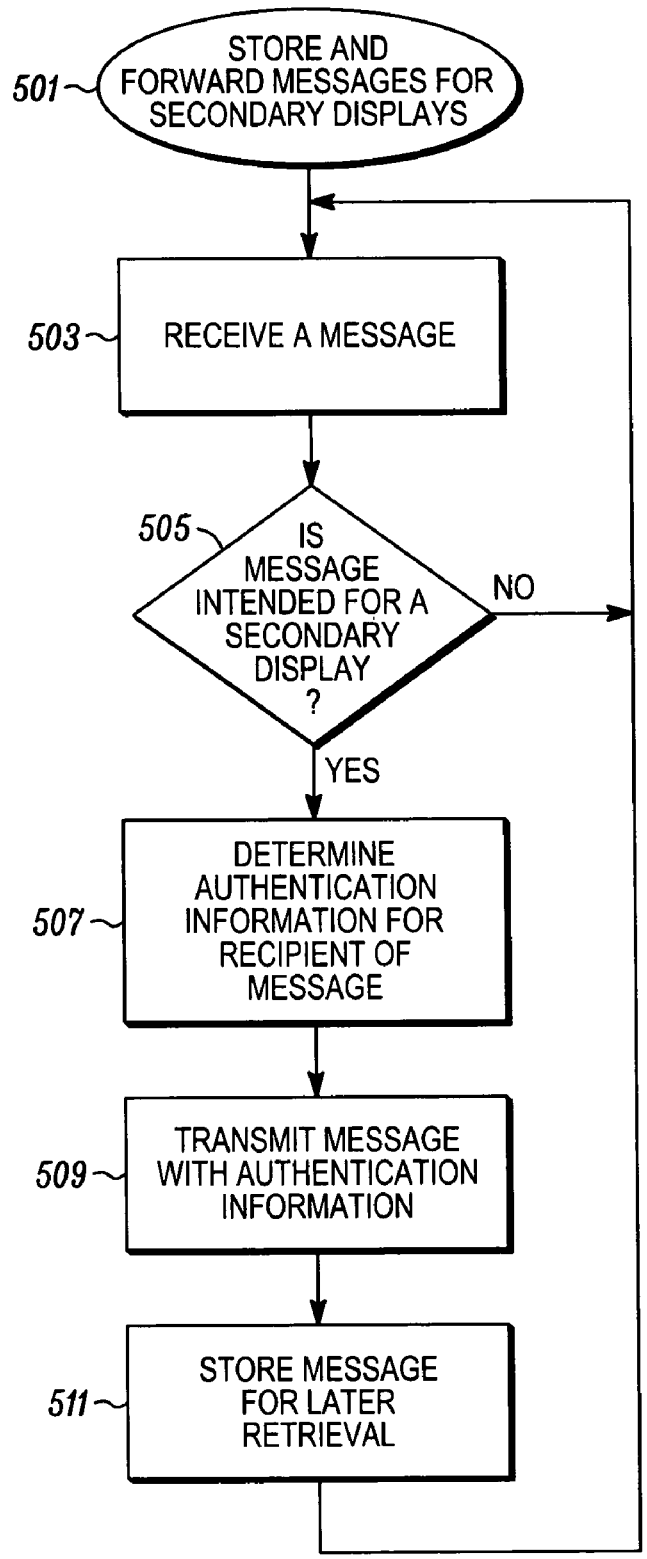
FIG. 5 is a flow chart illustrating an exemplary procedure for storing and forwarding a shared message in accordance with various exemplary and alternative exemplary embodiments.

Referring now to FIG. 3, FIG. 4, and FIG. 5, flow charts will be discussed and described that illustrate exemplary procedures and alternative exemplary procedures that can be utilized in connection with, respectively, a communication unit receiving a shared message, a communication unit transmitting a shared message, and a system for storing and forwarding shared messages.

Referring now to FIG. 3, receiving and displaying a shared message will be discussed and described. FIG. 3 is a flow chart illustrating an exemplary procedure for displaying 301 a shared message in accordance with various exemplary embodiments. The procedure can advantageously be implemented in connection with a processor of a communication unit, such as illustrated for example in FIG. 2 or other apparatus with similar functionality.

The procedure provides for getting 303 a message (subsequent message when process is repeated) from a receiver. The procedure checks 305 whether the message is properly authenticated, as described previously in more detail. If not, then the procedure branches to optionally interact 313 with the user to transmit authentication information to another user, as described in more detail above. The procedure than branches to get 303 a subsequent message from the receiver, as discussed above.

If the message does authenticate 305, then the procedure optionally adds 307 the message to the optional slide show, as described previously in more detail. The procedure provides 309 the message, optionally from the slide show, on the secondary display. The procedure optionally forwards 311 the message via the transmitter, including interacting with the user to forward the message, as described in more detail above. Then the procedure optionally interacts 313 with the user to transmit authentication information to another user, as described in more detail above. The procedure than branches to get 303 the subsequent message from the receiver, as discussed above and the process repeats as needed.

Referring now to FIG. 4, transmitting a message for sharing on a display, such as a secondary display will be discussed and described. FIG. 4 is a flow chart illustrating an exemplary procedure for sending a shared message 401 in accordance with various exemplary embodiments. The procedure can advantageously be implemented in connection with a processor of a communication unit, such as illustrated, for example, in FIG. 2 or other appropriately configured apparatus.

The procedure includes 403 selection of one or more messages, for example by interacting with a user, to send to another user, e.g. to be pushed automatically to the secondary display of the communication unit of the other user, as described for example previously herein. The procedure determines 405 the authentication information associated with the recipient of the message or messages, also described above in more detail. The procedure transmits 407 the message, in association with the authentication information, as previously described in more detail and then repeats as needed.

Referring now to FIG. 5, storing and forwarding one or more messages for sharing on secondary displays 501 will be discussed and described. FIG. 5 is a flow chart illustrating an exemplary procedure for storing and forwarding a shared message in accordance with various exemplary embodiments. The procedure can advantageously be implemented in connection with a processor of the message log, for example, as illustrated and described in connection with FIG. 1 or similarly configured apparatus.

The procedure provides for receiving a message 503, and determining 505 whether the message is intended for a secondary display. If the message is not intended for a secondary display, the procedure branches to receive another message 503.

If the message is intended for a secondary display, then the procedure determines 507 the authentication information for the recipient of the message. The message is associated with the authentication information, if appropriate, and the message is transmitted 509 with the authentication information. Further, the procedure can store 511 the message for later retrieval. The procedure can then loop to receive another message 503.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A communication device comprising:
   a receiver for receiving messages;
   a display;
   a processor configured to facilitate receiving via the receiver at least one message including content to be presented to a user; to facilitate authenticating the at least one message; and to facilitate automatically displaying, responsive to receipt of the at least one message, the content of the at least one message on the display,
   wherein the at least one message is associated with an indication that it is for display on a secondary display, and wherein the processor is further configured to facilitate detecting whether the at least one message is associated with the indication prior to automatically displaying the message.

2. The communication device of claim 1, wherein the content of the at least one message includes at least one of video, audio, images and text.

3. The communication device of claim 1, wherein the content of the at least one message includes a digital photograph.

4. The communication device of claim 1, wherein there are provided a plurality of messages including the at least one message; and wherein the content of the plurality of messages are displayed on the secondary display in a slide show format.

5. The communication device of claim 1, further comprising a display interface, wherein the processor is further configured to facilitate transmitting the content of the at least one message for display via the display interface.

6. The communication device of claim 1, wherein the processor is further configured to facilitate determining at least one sender corresponding to the at least one message, and wherein the authenticating comprises determining whether the at least one sender is approved.

7. The communication device of claim 1, wherein the processor is further configured to facilitate interacting with the user to designate authentication information; and further wherein the authenticating includes comparing information representative of the at least one message with the authentication information.

8. The communication device of claim 1, wherein the display is a secondary display disposed in a closed lid interface configuration.

9. The communication device of claim 1, wherein the processor is further configured to facilitate storing a content of the at least one message for later display on the secondary display.

10. The communication device of claim 1, further comprising a transmitter, for transmitting messages when operably connected to a communication network, wherein the processor is further configured to facilitate forwarding the at least one message via the transmitter.

11. The communication device of claim 1, further comprising a transmitter, for transmitting messages when operably connected to a communication network; wherein the processor is further configured to facilitate transmitting authentication information; and further wherein the authenticating includes comparing information representative of the at least one message with the authentication information.

12. A communication device, comprising:
    a transmitter, for transmitting messages;
    a processor, wherein the processor is configured to facilitate, responsive to a selection of at least one message, associating an indication with the at least one message as intended for display on a secondary display; to facilitate associating authentication information with the at least one message; and to facilitate transmitting the at least one message associated with the indication and the authentication information.

13. The communication device of claim 12, wherein the at least one message is transmitted to one or more of: a recipient, and a message log.

14. The communication device of claim 12, further comprising a receiver, for receiving messages when operably connected to a communication network; wherein the processor is further configured to facilitate receiving the authentication information.

15. A message log, comprising:
    a transceiver for sending and receiving messages when operably connected to a communication network;

a processor, the processor being configured to facilitate receiving at least one message, the at least one message being associated with at least one recipient and being associated with an indication that the at least one message as intended for display on a secondary display; and to facilitate transmitting the at least one message associated with the indication and authentication information to the at least one recipient.

16. The device of claim 15, wherein the process is further configured to determine whether to associate authentication information with the at least one message, and if so, associating authentication information with the at least one message.

17. The computer of claim 15, wherein the processor is further configured to facilitate interacting with a user to designate authentication information to be associated with the at least one message.

18. The computer of claim 15, wherein the processor is further configured to facilitate authenticating the at least one message prior to transmitting the at least one message.

19. The computer of claim 18, wherein the authenticating includes comparing information representative of the at least one message with the authentication information.

* * * * *